US008713278B2

(12) United States Patent
Palaniappan et al.

(10) Patent No.: US 8,713,278 B2
(45) Date of Patent: Apr. 29, 2014

(54) SYSTEM AND METHOD FOR STRANDED FILE OPENS DURING DISK COMPRESSION UTILITY REQUESTS

(75) Inventors: Murali Palaniappan, Tamil Nadu (IN);
Renjith Unni Saraladevi, Kerata (IN);
Sanjit K. Pradhan, Orissa (IN);
Vaibhav A. Nalawade, Maharastra (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1576 days.

(21) Appl. No.: 11/113,831

(22) Filed: Apr. 25, 2005

(65) Prior Publication Data

US 2006/0242182 A1    Oct. 26, 2006

(51) Int. Cl.
*G06F 13/38* (2006.01)

(52) U.S. Cl.
USPC .............................. 711/170; 711/165; 710/59

(58) Field of Classification Search
USPC ...................................... 711/165, 170; 710/59
See application file for complete search history.

(56) References Cited

U.S. PATENT DOCUMENTS

| | | | | |
|---|---|---|---|---|
| 5,317,752 A | * | 5/1994 | Jewett et al. | 714/14 |
| 5,771,369 A | * | 6/1998 | Curran | 711/105 |
| 6,070,172 A | * | 5/2000 | Lowe | 707/205 |
| 6,564,229 B1 | * | 5/2003 | Baweja et al. | 707/200 |
| 6,757,801 B1 | * | 6/2004 | Best et al. | 711/170 |

OTHER PUBLICATIONS

L. W. McVoy and S. R. Kleiman. Extent-like performance from a UNIX file system. In Proceedings of the Winter 1991.*
Tanenbaum, A. S. Structured Computer Organization. 1984. Prentice Hall Inc. 2nd ed. pp. 10-12.*

* cited by examiner

*Primary Examiner* — Tuan Thai
*Assistant Examiner* — Samuel Dillon

(57) ABSTRACT

A technique for handling stranded file opens for DCOM utility requests in a NSK. In one example embodiment, this is achieved by selecting a source file to be compressed in a disk by the DCOM utility. The source file includes one or more non-contiguous disk file extents and each non-contiguous disk file extent includes multiple blocks. A temporary file is then crated to copy the source file. The multiple blocks in a current non-contiguous disk file extent are then copied from the source file by the DCOM utility by transferring data to the disk as a function of a NSK net transfer data limit size. A current file descriptor of the source file is then stored in an offset field of the temporary file and a current value is then set in the offset field of a source file control block of the source file as a function of whether all of the multiple blocks in the current non-contiguous disk file extent were copied to the disk.

23 Claims, 3 Drawing Sheets

SYSTEM AND METHOD FOR STRANDED FILE OPENS DURING DISK COMPRESSION UTILITY REQUESTS

TECHNICAL FIELD OF THE INVENTION

The present invention relates generally to storing data on a hard disk drive, and more particularly relates to a disk compression (DCOM) utility.

BACKGROUND OF THE INVENTION

Typically disk drives are formatted physically and logically. Physically, a disk is divided into many equal-sized regions, such as sectors (pie slices) and tracks (concentric circles), so that data can be recorded in a logical manner and accessed quickly by read/write heads that move back and forth over the disk as it spins. Logically, a disk is formatted according to the standards of a host operating system.

To increase the storage efficiency of disk's they are generally defragmented. One approach to defragmentation is to use a DCOM utility of Hewlett Packard's NonStop Kernel operating system (NSK) that moves disk file extents to yield more usable space on a disk. The disk file extents are a collection of pages. Each page includes a block of data and/or a storage space on the disk. The DCOM utility first analyzes the current space allocation on a disk. The disk file extents on the disk are then relocated. Further, the free disk file extents are then combined into larger disk file extents so that files can be later allocated with larger disk file extents.

The above DCOM utility achieves the defragmentation by creating a temporary file for each source file that needs to copy the disk file extents. The DCOM utility then calls a file OPEN command for each temporary file, which is then implemented by the NSK. The NSK then allocates a new file control block (FCB) structure and a new open control block structure for this OPEN command. The DCOM utility then calls a COPY request for the source file, which then creates a FCB structure without opening the source file that allows the DCOM utility to defrag the source file in the background. The DCOM utility then removes the free disk file extents from a free space table attached to the temporary file and the disk file extent information is then stored in the FCB structure of the temporary file. The NSK then copies the disk file extent from the source file to the temporary file. The new disk file extent is then added to the file label of the source file and written to the disk when the disk file extent copy is completed. The old disk file extent is then added to the free space table in the disk.

When the DCOM utility copies the disk file extents to the temporary file, the number of disk file extents to be copied is more than a maximum input/output (I/O) value set in the NSK, such as a prefixed disk parameter (MAX_COPY_EXTENT) stored in the NSK, then the copy request will be redriven by the NSK. A redrive of a DCOM request can occur when the number of reads/writes to/from a disk exceeds a threshold value set in the NSK. In such an event, the NSK stores a value, thus far copied by the DCOM utility, in an offset field of a return buffer and sends it to the DCOM utility. The value stored in the offset field is a position value that is relative to the beginning of the file where the copying of the file starts after a redrive request. Further, in such a case, the DCOM utility has to again call back with the specified value stored in the offset field for the NSK to continue from the previously stored offset value. The NSK then stores the offset value in the source file control structure for a later use, such as a validation of the source file control structure.

One problem with the above-described DCOM utility process is for any reason the DCOM utility does not come back after the NSK redrives the COPY request, then the value stored in the offset field in the file control structure is not cleared. In such an instance, the NSK can close the temporary file that was opened by the DCOM utility. Since the source file was not opened by the DCOM utility the NSK cannot close the source file and therefore the FCB can be left stranded. Such a source file, that is left stranded, cannot be accessed for writing or purging by other applications. Further, such a condition can result in adverse effects. For example, a rerun of the DCOM utility cannot defrag that source file. Also, such a stranded file cannot be purged or renamed.

SUMMARY OF THE INVENTION

According to an aspect of the invention, there is provided a method for handling a stranded file open for DCOM utility requests in a NSK, the method comprising the steps of selecting a source file to be compressed in a disk by the DCOM utility, wherein the source file includes one or more non-contiguous disk file extents, and wherein each non-contiguous disk file extent includes multiple blocks, creating a temporary file to copy the source file, copying multiple blocks in a current non-contiguous disk file extent from the source file by the DCOM utility by transferring data to the disk as a function of an NSK net transfer data limit size, determining whether all of the blocks in the current non-contiguous disk file extent have been copied onto the disk, and storing a current file descriptor of the source file in an offset field of the temporary file and setting a current value in the offset field of a source file control block of the source file as a function of the determination.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "determining", "instrumenting", and "executing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to use other computer systems such as, for example, optical and mechanical computers.

Figure 1:
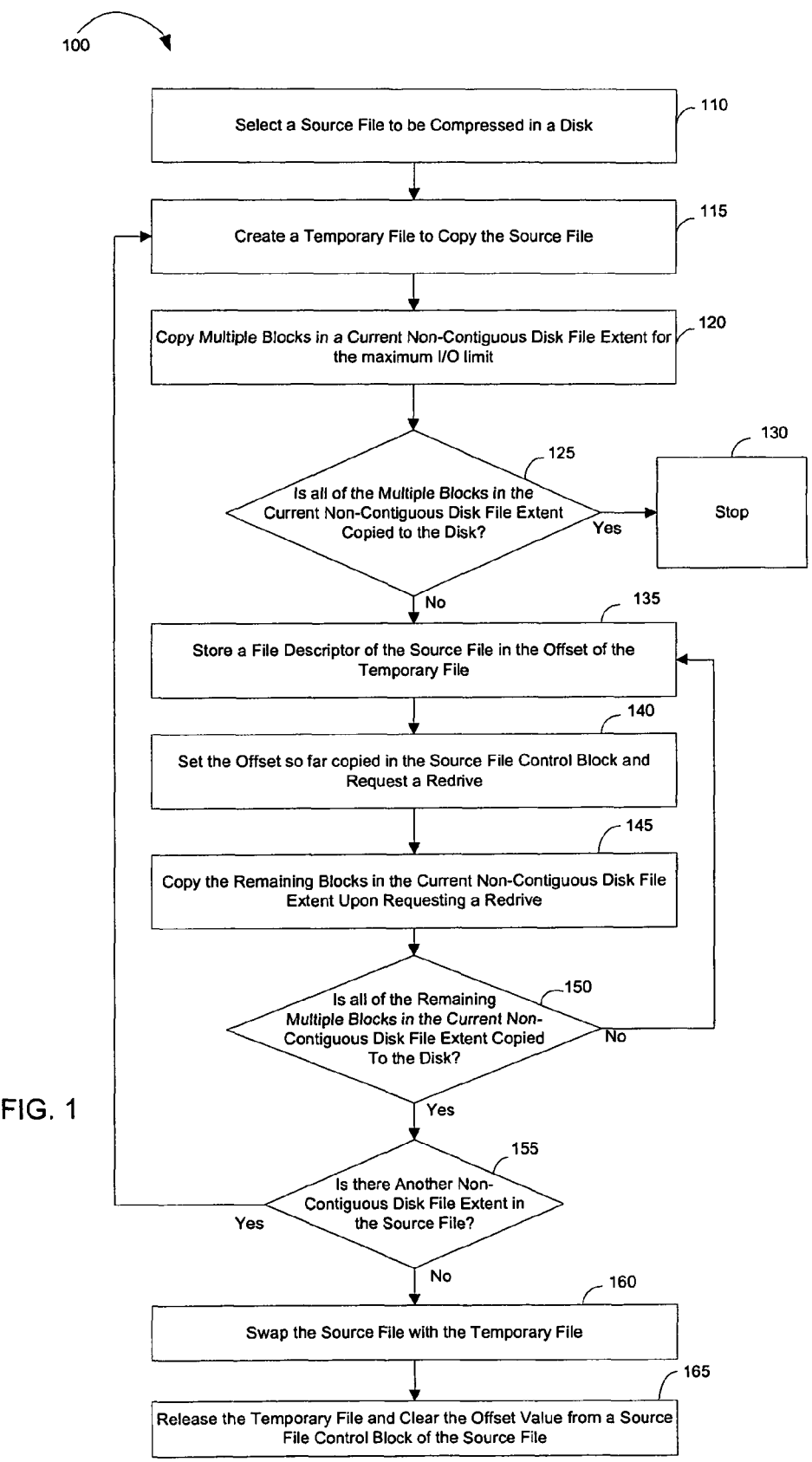
FIG. 1 is a flowchart illustrating an example method to handle stranded file opens for the DCOM utility requests in NSK operating system according to an embodiment of the present invention.

FIG. 1 illustrates an example method 100 for handling a stranded file open for DCOM utility requests in NSK. At step 110, this example method 100 begins by selecting a source file to be compressed in a disk by the DCOM utility. In these embodiments, the source file includes one or more non-contiguous disk file extents. Also in these embodiments, each file extent includes multiple blocks. Each block can include data and/or disk space.

Generally, the DCOM utility moves disk file extents to yield more usable space on a disk. Following are some of the tasks performed by the DCOM utility:

Analyzes the current space allocation on a disk
Re-allocates file extents on a disk
Reduces the number of free-space extents to reduce effort needed to allocate or de-allocate disk space
Combines free space into larger extents so that files can be allocated with larger extents, which can decrease the incidence of file-system errors, such as inability to obtain disk space for the file extent and so on.

In these embodiments, the DCOM utility can run online while the disk is operating. Also, the DCOM utility can reduce the number of free space fragments on a disk. The DCOM utility returns information to the command process that invoked the DCOM utility. The information that is returned includes whether or not the operation was successful. In addition, DCOM utility supports batch processing by allowing conditional execution of subsequent processes that are based on the success of the DCOM process. The DCOM utility compresses a disk even when the disk is in use by another application.

At step 115, a temporary file is created to copy the source file. In these embodiments, the DCOM utility creates a temporary file for each source file that requires copying the disk file extents.

At step 120, multiple blocks in a current non-contiguous disk file extent are copied from the source file by transferring data to the disk as a function of an NSK net transfer data limit size by the DCOM utility. In some embodiments, the DCOM utility will call an OPEN command for the temporary file. The NSK will then implement the OPEN command received from the DCOM utility. The NSK then allocates a new FCB structure for this OPEN command. The DCOM utility then calls a COPY request and the NSK then directly creates the FCB structure without executing an OPEN command for the source file. The NSK will then do a physical disk extent copy from the source file to the temporary file. When the extent copy is completed, the new extent will then be added to the file label of the source file and it will be written to the disk. Further, the old extent will be added to the free space table. In these embodiments, the NSK net transfer data limit size is set by the NSK. The NSK net transfer data limit size basically limits the number of disk file extents that can be copied for each copy request received from the DCOM utility. The NSK net transfer data limit size can be based on a number of multiple blocks in a disk file extent or a number of disk file extents in the source file.

At step 125, the method 100 determines whether all of the multiple blocks in the current non-contiguous disk file extent were copied to the disk. Based on the determination at step 125, if all of the multiple blocks in the current non-contiguous disk file extent have been copied to the disk then the method 100 goes to step 130 and stops the process of handling the stranded file open for DCOM utility requests in the NSK.

Based on the determination at step 125, if all of the multiple blocks in the current non-contiguous disk file extent were not copied to the disk then the method 100 goes to step 135, and stores the file descriptor of the source file in an offset field of the temporary file. Further, at step 140, the method 100 sets a current value in the offset field of a source FCB of the source file and requests a redrive. A redrive can occur during a copy request, if the number of multiple blocks in a disk file extent and/or a number of file extents in the source file exceeds the NSK net transfer data limit size. In these embodiments, the NSK stores the current value in a return buffer and sends it to the DCOM utility.

At step 145, the remaining blocks in the current non-contiguous disk file extent are copied from the source file by the DCOM utility by transferring data to the disk as a function of the NSK net transfer data limit size upon requesting a redrive by the DCOM utility.

At step 150, the method 100 determines whether all of the multiple blocks in the current non-contiguous disk file extent were copied to the disk. Based on the determination at step 150, if all of the multiple blocks in the current non-contiguous disk file extent were not copied, then the method 100 goes to step 135 and repeats the steps 135-150. In these embodiments, the DCOM utility calls back with the stored current value in the offset field and the NSK continues the copying of the remaining blocks from the current value stored in the offset field. In some embodiments, the NSK stores the current value in the source FCB structure for validation purposes. The redrive helps to distribute the load on the NSK to other applications and facilitates in scheduling of the copying process.

In some embodiments, the NSK stores a file descriptor of the source file in the offset field of the temporary file and sets a next value in the offset field of the source file if all of the multiple blocks in the current non-contiguous disk file extent were not copied. In some embodiments, the NSK stores an FCB structure number of the source file, which can be a unique identifier for the associated FCB structure, in the offset field of the FCB structure of the temporary file. Based on the determination at step 150, if all of the multiple blocks in the current non-contiguous disk file extent were copied then the method 100 goes to step 155.

At step 155, the method 100 determines whether there is another non-contiguous disk file extent in the source file. Based on the determination at step 155, if there is another non-contiguous disk file extent in the source file then the method 100 goes to step 115 and repeats the steps 115-155. Based on the determination at step 155, if there is no other non-contiguous disk file extent in the source file then the method 100 goes to step 160.

At step 160, the source file is swapped with the temporary file. At step 165, the temporary file is released and the current value is cleared in the offset field of the source file. In some embodiments, the temporary file is released and the current value set in the offset field of the source FCB is cleared upon receipt of a process death message from the DCOM utility via the NSK. This facilitates in accessing the source file for writing and purging by other application programs.

Although the flowchart 100 includes steps 110-165 that are arranged serially in the exemplary embodiments, other embodiments of the invention may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 2:
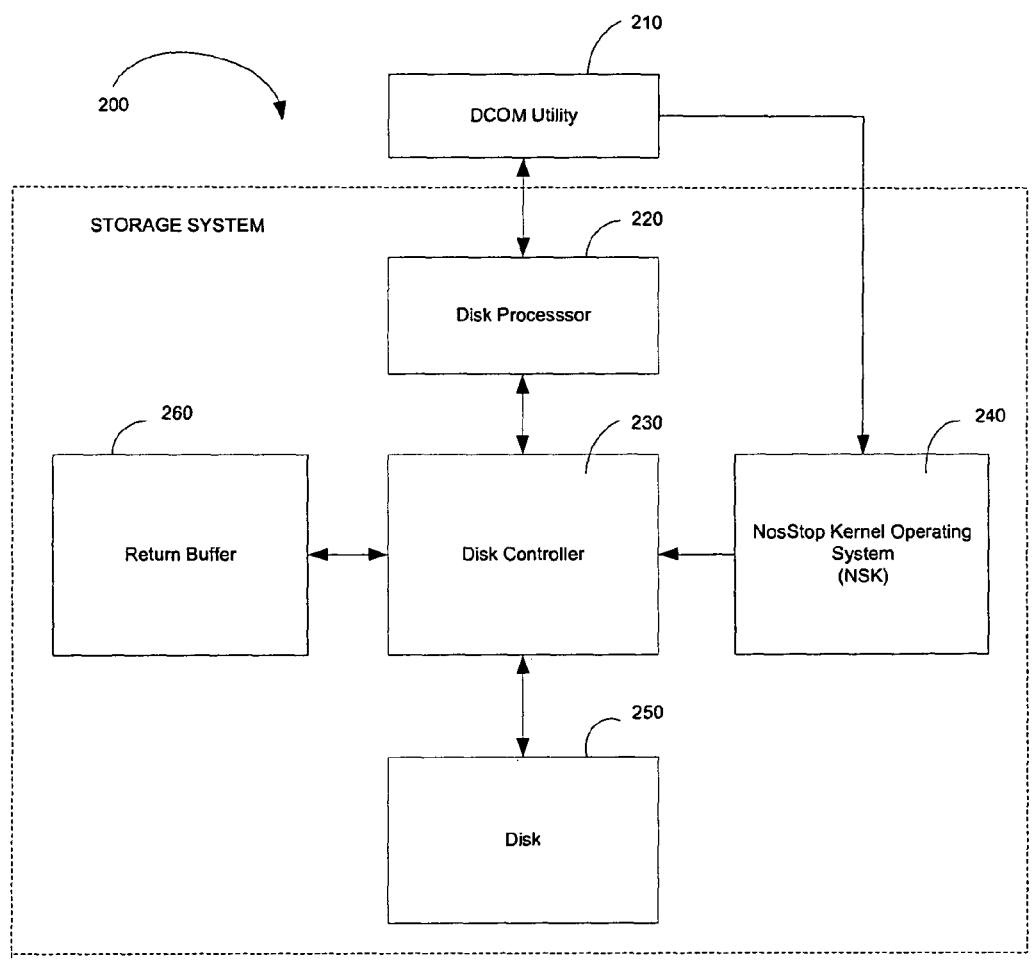
FIG. 2 is a block diagram illustrating the organization of a disk drive according to an embodiment of the present invention.

Referring now to FIG. 2, there is illustrated a storage system 200 according to an embodiment of the present invention. As shown in FIG. 2, the storage system 200 includes a DCOM utility 210, a disk processor 220, a disk controller 230, a NSK 240, a disk 250, and a return buffer 260. Further, as shown in FIG. 2, the disk controller 230 is coupled to the disk processor 220, the NSK 240, the disk 250, and the return buffer 260.

In operation, the DCOM utility 210 selects a source file to be compressed on the disk 250 via the disk controller 230. In these embodiments, the source file includes one or more non-contiguous disk file extents. Each disk file extent includes multiple blocks. The DCOM utility 210 then creates a temporary file in the return buffer 260 to copy the source file. The DCOM utility 210 will then copy the multiple blocks in a current non-contiguous disk file extent from the source file by transferring data to the disk as a function of an NSK net transfer data limit size via the disk controller 230.

The disk processor 220 then determines whether all of the multiple blocks in the current non-contiguous disk file extent were copied to the disk. The disk controller 230 then stops handling of the stranded file open for DCOM utility requests if all of the multiple blocks in the current non-contiguous disk file extent were copied to the disk 250.

The NSK then stores a current file descriptor and sets a current value in the offset field of a source FCB of the source file as a function of the determination. In some embodiments, the NSK stores the current file descriptor and sets a current value in the offset field of the source FCB of the source file if all of the multiple blocks in the current non-contiguous disk file extent were not copied to the disk.

The DCOM utility 210 then requests a redrive via the disk controller 230 if all of the multiple blocks in the current non-contiguous disk file extent were not copied to the disk 250. The DCOM utility 210 then copies remaining blocks in the current non-contiguous disk file extent from the source file by transferring data to the disk 250 as a function of the NSK net transfer data limit size set by the NSK 240 upon requesting the redrive by the DCOM utility 210.

The disk processor 220 then determines whether there is another non-contiguous disk file extent in the source file. The NSK 240 then sends a request via the disk controller 230 to swap the source file with the temporary file, releases the temporary file, and clears the value stored in the offset field of the source file if there are no other non-contiguous disk file extents in the source file.

In some embodiments, the NSK 240 releases the temporary file via the disk controller 230 and clears the current value set in the offset field of the source FCB upon receipt of a process death message from the DCOM utility 210. The operation of the storage system 200 that is used to handle a stranded file open for DCOM utility requests in an NSK is explained in more detail with reference to FIG. 1.

Embodiments of the present invention described here are not specific to any particular architecture; however, example implementations are described in the context of a NSK environment running on processors, such as MIPS or Itanium™ processors.

Various embodiments of the present invention can be implemented in software, which may be run in the environment shown in FIG. 3 (to be described below) or in any other suitable computing environment. The embodiments of the present invention are operable in a number of general-purpose or special-purpose computing environments. For example, these may include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. Furthermore, embodiments of the present invention may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 3:
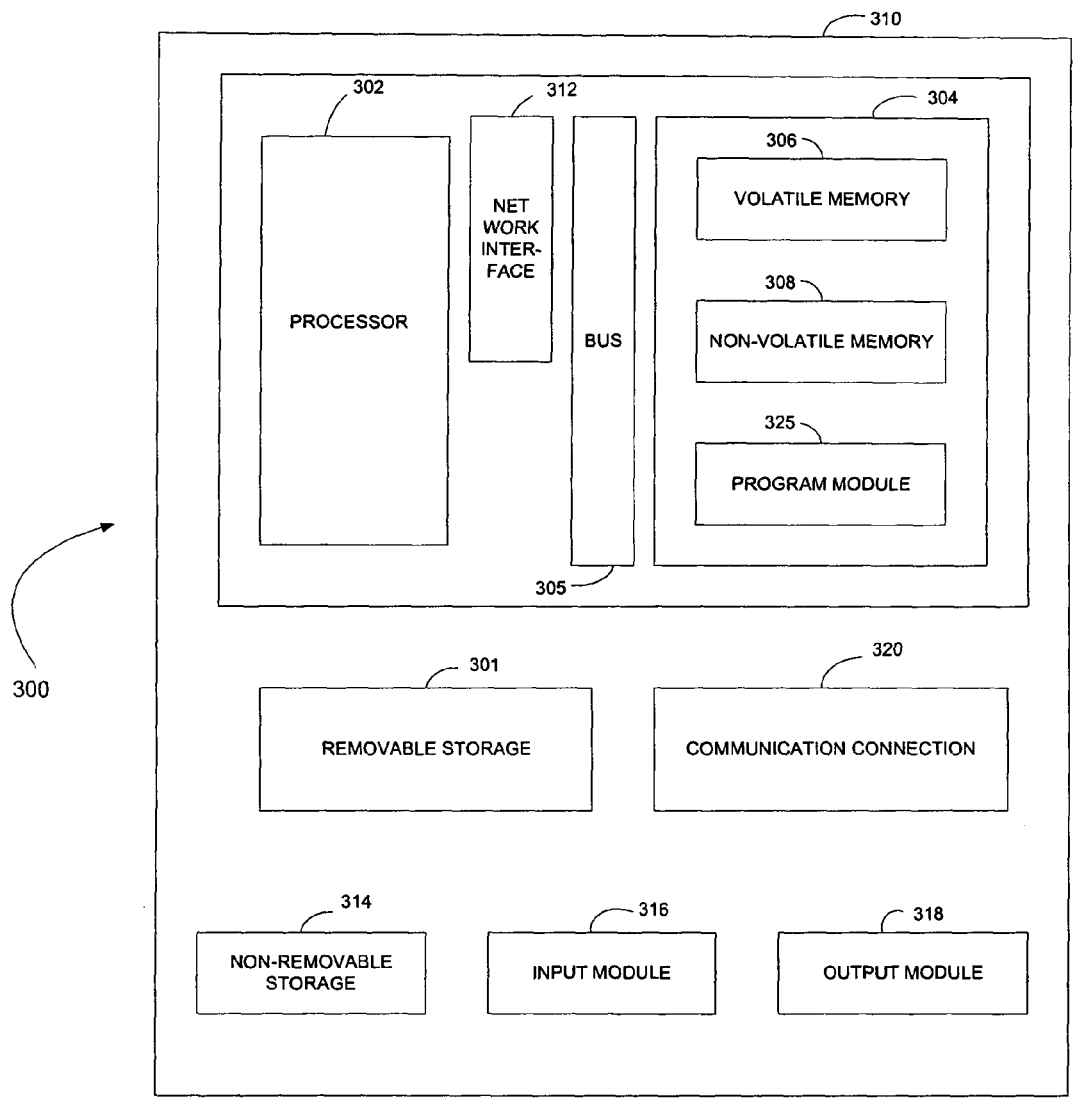
FIG. 3 is a block diagram of a typical computer system used for implementing embodiments shown in FIGS. 1 and 2.

FIG. 3 shows an example of a suitable computing system environment for implementing embodiments of the present invention. FIG. 3 and the following discussion are intended to provide a brief, general description of a suitable computing environment in which certain embodiments of the inventive concepts contained herein may be implemented.

A general computing device, in the form of a computer 310, may include a processor 302, memory 304, removable storage 301, and non-removable storage 314. Computer 310 additionally includes a bus 305 and a network interface (NI) 312.

Computer 310 may include or have access to a computing environment that includes one or more user input modules 316, one or more output modules 318, and one or more communication connections 320 such as a network interface card or a USB connection. The one or more output devices 318 can be a display device of computer, computer monitor, TV screen, plasma display, LCD display, display on a digitizer, display on an electronic tablet, and the like. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 301 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 302 of the computer 310. For example, a program module 325 may include machine-readable instructions capable of handling stranded file opens for DCOM utility requests in a NSK according to the teachings and herein described embodiments of the present invention. In one embodiment, the program module 325 may be included on a CD-ROM and loaded from the CD-ROM to a hard drive in non-volatile memory 308. The machine-readable instructions cause the computer 310 to encode according to the various embodiments of the present invention. As shown, the program module 325 includes instructions to handle the stranded file open for the DCOM utility request according to various embodiments of the present invention.

The operation of the computer system 300 for handling the stranded file open requests for the DCOM utility requests in the NSK is explained in more detail with reference to FIG. 1.

This process allows accessing a stranded file for writing and purging by another application program. Further, the process allows the users to stop the DCOM utility process without any adverse effects to the stranded file. In addition, the process provides the capability to purge a stranded file without having to wait for the DCOM utility to complete disk compression. The above-described technique allows the purge to go through by making the DCOM utility skip the stranded file. The above technique allows the users to stop the DCOM utility during the file access without any adverse effects.

The above description is intended to be illustrative and not restrictive and other embodiments will be apparent to those skilled in the art. The scope of the invention should therefore be determined by the appended claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art and the elements, algorithms, and sequence of operations can all be varied to suit particular requirements or contexts. The operations described-above with respect to the method illustrated in FIG. 1 can be performed in a different order from those shown and described herein.

FIGS. 1-3 are merely representational and are not drawn to scale. Certain proportions thereof may be exaggerated, while others may be minimized. FIGS. 1-3 illustrate various embodiments of the invention that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method for handling a stranded file open for DOOM utility requests in a NonStop Kernel (NSK) comprising:
   selecting a source file to be compressed in a disk by the DOOM utility, wherein the source file includes one or more non-contiguous disk file extents, and wherein each noncontiguous disk file extent includes multiple blocks;
   creating a temporary file to copy the source file by the DOOM utility;
   copying multiple blocks in a current non-contiguous disk file extent from the source file by transferring data to the temporary file as a function of a NSK net transfer data limit size by the DOOM utility;
   determining, for the stranded file open, whether all of the multiple blocks in the current non-contiguous disk file extent of the source file were copied to the disk, wherein the stranded file open is a source file that is left stranded when a current value stored in an offset field of a file control block (FCB) of the source file is not cleared due to a DOOM utility failure;
   if not, then storing a current file descriptor of the source file in an offset field of the temporary file; and
   setting a current value in the offset field of a source file control block of the source file for handling the stranded file open for the DOOM utility requests.

2. The method of claim 1, further comprising:
   if so, then stopping the handling of the stranded file open for the DOOM utility requests.

3. The method of claim 1, further comprising:
   requesting a redrive by the DOOM utility; and
   copying remaining blocks in the current non-contiguous disk file extent from the source file by the DOOM utility by transferring data to the disk as a function of the NSK net transfer data limit size upon requesting the redrive by the DOOM utility.

4. The method of claim 3, further comprising:
   determining whether all of the remaining multiple blocks in the current non-contiguous disk file extent were copied to the disk;
   if not, then storing a next file descriptor of the source file in the offset field of the temporary file; and
   setting a next value in the offset field of the source file.

5. The method of claim 4, further comprising:
   if so, determining whether there is another non-contiguous disk file extent in the source file; and
   if there is no other non-contiguous disk file extent in the source file, then swapping the source file with the temporary file, releasing the temporary file, and clearing the current value in the offset field of the source file.

6. The method of claim 3, further comprising:
   releasing the temporary file and clearing the current value in the offset field of the source FCB upon receipt of a process death message from the DOOM utility via the NSK.

7. An article comprising:
   a non-transitory storage medium having instructions that, when executed by a computing platform, result in execution of a method for handling a stranded file open for DOOM utility requests in a NonStop Kernel comprising:

selecting a source file to be compressed in a disk by a DOOM utility, wherein the source file includes one or more non-contiguous disk file extents, and wherein each non-contiguous disk file extent includes multiple blocks;

creating a temporary file to copy the source file by the DOOM utility;

copying multiple blocks in a current non-contiguous disk file extent from the source file by the DOOM utility by transferring data to the temporary file as a function of an NSK net transfer data limit size;

determining, for the stranded file open, whether all of the multiple blocks in the current non-contiguous disk file extent of the source file were copied to the disk, wherein the stranded file open is a source file that is left stranded when a current value stored in an offset field of a file control block (FCB) of the source file is not cleared due to a DOOM utility failure;

if not, then storing a current file descriptor of the source file in an offset field of the temporary file; and setting a current value in the offset field of a source file control block of the source file for handling the stranded file open for the DOOM utility requests.

8. The article of claim 7, further comprising:
if so, then stopping the handling of the stranded file open for the DOOM utility requests.

9. The article of claim 7, further comprising:
requesting a redrive by the DOOM utility; and
copying remaining blocks in the current non-contiguous disk file extent from the source file by the DOOM utility by transferring data to the disk as a function of the NSK net transfer data limit size upon requesting the redrive by the DOOM utility.

10. The article of claim 9, further comprising:
determining whether all of the remaining multiple blocks in the current non-contiguous disk file extent were copied to the disk;
if not, then storing a next file descriptor of the source file in the offset field of the temporary file; and
setting a next value in the offset field of the source file.

11. The article of claim 9, further comprising:
if so, determining whether there is another non-contiguous disk file extent in the source file; and
if not, then swapping the source file with the temporary file, releasing the temporary file and clearing the current value in the offset field of the source file.

12. The article of claim 9, further comprising:
releasing the temporary file and clearing the current value in the offset field of the source FCB upon receipt of a process death message from the DOOM utility via the NSK.

13. A computer system comprising:
a network interface;
an input module coupled to the network interface that receives input data via the network interface;
a processing unit; and
a memory coupled to the processor, the memory having stored therein code which when decoded by the processor, the code causes the processor to perform a method for handling a stranded file open for DOOM utility requests in a NonStop Kernel comprising:
  selecting a source file to be compressed in a disk by the DOOM utility, wherein the source file includes one or more non-contiguous disk file extents, and wherein each non-contiguous disk file extent includes multiple blocks;
  creating a temporary file to copy the source file by the DOOM utility;
  copying multiple blocks in a current non-contiguous disk file extent from the source file by the DOOM utility by transferring data to the temporary file as a function of an NSK net transfer data limit size;
  determining, for the stranded file open, whether all of the multiple blocks in the current non-contiguous disk file extent of the source file were copied to the disk, wherein the stranded file open is a source file that is left stranded when a current value stored in an offset field of a file control block (FCB) of the source file is not cleared due to a DOOM utility failure;
  if not, then storing a current file descriptor of the source file in an offset field of the temporary file; and
  setting a current value in the offset field of a source file control block of the source file for handling the stranded file open for the DOOM utility requests.

14. The system of claim 13, further comprising:
if so, then stopping the handling of the stranded file open for the DOOM utility requests.

15. The system of claim 13, further comprising:
requesting a redrive by the DOOM utility; and
copying remaining blocks in the current non-contiguous disk file extent from the source file by the DOOM utility by transferring data to the disk as a function of the NSK net transfer data limit size upon requesting the redrive by the DOOM utility.

16. The system of claim 15, further comprising:
determining whether all of the remaining multiple blocks in the current non-contiguous disk file extent were copied to the disk;
if not, then storing a next file descriptor of the source file in the offset field of the temporary file; and
setting a next value in the offset field of the source file.

17. The system of claim 15, further comprising:
if so, determining whether there is another non-contiguous disk file extent in the source file; and
if not, then swapping the source file with the temporary file, releasing the temporary file and clearing the current value in the offset field of the source file.

18. The system of claim 15, further comprising:
releasing the temporary file and clearing the current value in the offset field of the source FCB upon receipt of a process death message from the DOOM utility via the NSK.

19. A storage system for handling a stranded file open for DOOM utility requests in a NonStop Kernel comprising:
a disk;
a DOOM utility;
a disk controller;
an NSK coupled to the DOOM utility and the disk controller;
a return buffer coupled to the disk controller and the DOOM utility; and
a disk processor coupled to the DOOM utility and the disk controller, wherein the DOOM utility selects a source file to be compressed on the disk via the disk controller, wherein the source file includes one or more non-contiguous disk file extents, and wherein each noncontiguous disk file extent includes multiple blocks, wherein the DOOM utility to create a temporary file in the return buffer to copy the source file, wherein the DOOM utility to copy the multiple blocks in a current non-contiguous disk file extent from the source file by transferring data to the temporary file as a function of a NSK net transfer data limit size via the disk controller, wherein the disk processor to determine, for the stranded file open, whether all of the multiple blocks in the current non-contiguous disk file extent of the source file were copied to the disk, and wherein the stranded file open is a source file that is left stranded when a current value stored in an offset field of a file control block (FCB) of the source file is not cleared due to a DOOM utility failure, and wherein the NSK to store a current file descriptor of the source in an offset field of the temporary file and set a current value in the offset field of a source FCB of the source file as a function of the determination for handling the stranded file open for the DOOM utility requests.

20. The storage system of claim 19, wherein the disk controller to stop the handling of the stranded file open for DOOM utility requests if all the multiple blocks in the current non-contiguous disk file extent are copied to the disk.

21. The storage system of claim 19, wherein the DOOM utility requests a redrive via the disk controller if all of the multiple blocks in the current non-contiguous disk file extent were not copied to the disk, and wherein the DOOM utility copies remaining blocks in the current non-contiguous disk file extent from the source file by transferring data to the disk as a function of the NSK net transfer data limit size upon requesting the redrive by the DOOM utility.

22. The storage system of claim 21, wherein the disk processor determines whether there is another non-contiguous disk file extent in the source file, and wherein the NSK sends a request via the disk controller to swap the source file with the temporary file, releases the temporary file, and clears the current value stored in the offset field of the source file if there are no other non-contiguous disk file extents in the source file.

23. The storage system of claim 22, wherein the NSK releases the temporary file via the disk controller and clears the current value set in the offset field of the source FCB upon receipt of a process death message from the DOOM utility.

\* \* \* \* \*

UNITED STATES PATENT AND TRADEMARK OFFICE
CERTIFICATE OF CORRECTION

Page 1 of 3

PATENT NO. : 8,713,278 B2
APPLICATION NO. : 11/113831
DATED : April 29, 2014
INVENTOR(S) : Murali Palaniappan et al.

It is certified that error appears in the above-identified patent and that said Letters Patent is hereby corrected as shown below:

In the Claims:

In column 8, line 9, in Claim 1, delete "DOOM" and insert -- DCOM --, therefor.

In column 8, line 12, in Claim 1, delete "DOOM" and insert -- DCOM --, therefor.

In column 8, line 16, in Claim 1, delete "DOOM" and insert -- DCOM --, therefor.

In column 8, line 20, in Claim 1, delete "DOOM" and insert -- DCOM --, therefor.

In column 8, line 27, in Claim 1, delete "DOOM" and insert -- DCOM --, therefor.

In column 8, line 32, in Claim 1, delete "DOOM" and insert -- DCOM --, therefor.

In column 8, line 35, in Claim 2, delete "DOOM" and insert -- DCOM --, therefor.

In column 8, line 37, in Claim 3, delete "DOOM" and insert -- DCOM --, therefor.

In column 8, line 39, in Claim 3, delete "DOOM" and insert -- DCOM --, therefor.

In column 8, line 42, in Claim 3, delete "DOOM" and insert -- DCOM --, therefor.

In column 8, line 60, in Claim 6, delete "DOOM" and insert -- DCOM --, therefor.

In column 8, line 66, in Claim 7, delete "DOOM" and insert -- DCOM --, therefor.

In column 9, line 2, in Claim 7, delete "DOOM" and insert -- DCOM --, therefor.

In column 9, line 7, in Claim 7, delete "DOOM" and insert -- DCOM --, therefor.

In column 9, line 9, in Claim 7, delete "DOOM" and insert -- DCOM --, therefor.

In column 9, line 19, in Claim 7, delete "DOOM" and insert -- DCOM --, therefor.

Signed and Sealed this
Sixteenth Day of September, 2014

Michelle K. Lee
*Deputy Director of the United States Patent and Trademark Office*

CERTIFICATE OF CORRECTION (continued)
U.S. Pat. No. 8,713,278 B2

In column 9, line 24, in Claim 7, delete "DOOM" and insert -- DCOM --, therefor.

In column 9, line 27, in Claim 8, delete "DOOM" and insert -- DCOM --, therefor.

In column 9, line 29, in Claim 9, delete "DOOM" and insert -- DCOM --, therefor.

In column 9, line 31, in Claim 9, delete "DOOM" and insert -- DCOM --, therefor.

In column 9, line 34, in Claim 9, delete "DOOM" and insert -- DCOM --, therefor.

In column 9, line 51, in Claim 12, delete "DOOM" and insert -- DCOM --, therefor.

In column 9, line 61, in Claim 13, delete "DOOM" and insert -- DCOM --, therefor.

In column 9, line 64, in Claim 13, delete "DOOM" and insert -- DCOM --, therefor.

In column 10, line 2, in Claim 13, delete "DOOM" and insert -- DCOM --, therefor.

In column 10, line 4, in Claim 13, delete "DOOM" and insert -- DCOM --, therefor.

In column 10, line 13, in Claim 13, delete "DOOM" and insert -- DCOM --, therefor.

In column 10, line 18, in Claim 13, delete "DOOM" and insert -- DCOM --, therefor.

In column 10, line 21, in Claim 14, delete "DOOM" and insert -- DCOM --, therefor.

In column 10, line 23, in Claim 15, delete "DOOM" and insert -- DCOM --, therefor.

In column 10, line 25, in Claim 15, delete "DOOM" and insert -- DCOM --, therefor.

In column 10, line 28, in Claim 15, delete "DOOM" and insert -- DCOM --, therefor.

In column 10, line 45, in Claim 18, delete "DOOM" and insert -- DCOM --, therefor.

In column 10, line 48, in Claim 19, delete "DOOM" and insert -- DCOM --, therefor.

In column 10, line 50, in Claim 19, delete "DOOM" and insert -- DCOM --, therefor.

In column 10, line 52, in Claim 19, delete "DOOM" and insert -- DCOM --, therefor.

In column 10, line 55, in Claim 19, delete "DOOM" and insert -- DCOM --, therefor.

In column 10, line 56, in Claim 19, delete "DOOM" and insert -- DCOM --, therefor.

In column 10, line 57, in Claim 19, delete "DOOM" and insert -- DCOM --, therefor.

In column 10, line 62, in Claim 19, delete "DOOM" and insert -- DCOM --, therefor.

In column 10, line 63, in Claim 19, delete "DOOM" and insert -- DCOM --, therefor.

In column 11, line 7, in Claim 19, delete "DOOM" and insert -- DCOM --, therefor.

CERTIFICATE OF CORRECTION (continued)
U.S. Pat. No. 8,713,278 B2

In column 11, line 12, in Claim 19, delete "DOOM" and insert -- DCOM --, therefor.

In column 11, line 15, in Claim 20, delete "DOOM" and insert -- DCOM --, therefor.

In column 11, line 17, in Claim 21, delete "DOOM" and insert -- DCOM --, therefor.

In column 12, line 2, in Claim 21, delete "DOOM" and insert -- DCOM --, therefor.

In column 12, line 6, in Claim 21, delete "DOOM" and insert -- DCOM --, therefor.

In column 12, line 17, in Claim 23, delete "DOOM" and insert -- DCOM --, therefor.